United States Patent
Ecob

(10) Patent No.: US 8,425,219 B2
(45) Date of Patent: Apr. 23, 2013

(54) MECHANISM AND SYSTEM FOR CLAMPING

(75) Inventor: Robert Donald Ecob, Cambridge (CA)

(73) Assignee: ATS Automation Tooling Systems Inc., Cambridge, ON. (CA)

(*) Notice: Subject to any disclaimer, the term of this patent is extended or adjusted under 35 U.S.C. 154(b) by 218 days.

(21) Appl. No.: 13/074,232

(22) Filed: Mar. 29, 2011

(65) Prior Publication Data

US 2011/0236522 A1 Sep. 29, 2011

Related U.S. Application Data

(60) Provisional application No. 61/318,729, filed on Mar. 29, 2010.

(51) Int. Cl.
*B29C 33/22* (2006.01)

(52) U.S. Cl.
USPC .............. 425/170; 425/451.4; 425/451.9

(58) Field of Classification Search ............. 425/589, 425/595, 451.4, 451.9, 170
See application file for complete search history.

(56) References Cited

U.S. PATENT DOCUMENTS

| | | | | |
|---|---|---|---|---|
| 5,622,737 A | * | 4/1997 | Hehl | 425/451.4 |
| 7,004,746 B2 | * | 2/2006 | Weinmann et al. | 425/451.4 |
| 7,510,389 B2 | * | 3/2009 | Schroder | 425/451.4 |
| 2006/0257185 A1 | | 11/2006 | Furihata | |

FOREIGN PATENT DOCUMENTS

| | | |
|---|---|---|
| GB | 276309 A2 | 6/1927 |
| JP | 7085839 B | 9/1995 |

OTHER PUBLICATIONS

Canadian Intellectual Property Office, Form PCT/ISA/210—International Search Report dated Jun. 30, 2011, International Application No. PCT/CA2011/050161, Quebec Canada.
Canadian Intellectual Property Office, Form PCT/ISA/237—Written Opinion of the International Searching Authority dated Jun. 30, 2011, International Application No. PCT/CA2011/050161, Quebec Canada.
English Abstract of JP Application No. 05-226927, Publication No. 07-085839, Aug. 18, 2011, Patent Abstracts of Japan, Japanese Patent Office Website.

* cited by examiner

*Primary Examiner* — James Mackey
(74) *Attorney, Agent, or Firm* — Borden Ladner Gervais LLP; Neil Henderson

(57) ABSTRACT

A clamping mechanism having: a drive; a shaft connected to the drive; an eccentric hub that is driven to rotate by the shaft; a fixed support structure that supports the eccentric hub such that the eccentric hub can rotate; and a moving support structure that is connected to the eccentric hub such that the moving support structure is driven substantially linearly based on rotational motion of the eccentric hub and serves to clamp an object between the moving support structure and a fixed structure adjacent to the moving support structure. A clamping system is provided having, a single drive; a shaft connected to the drive; and a plurality of clamping mechanisms.

10 Claims, 4 Drawing Sheets

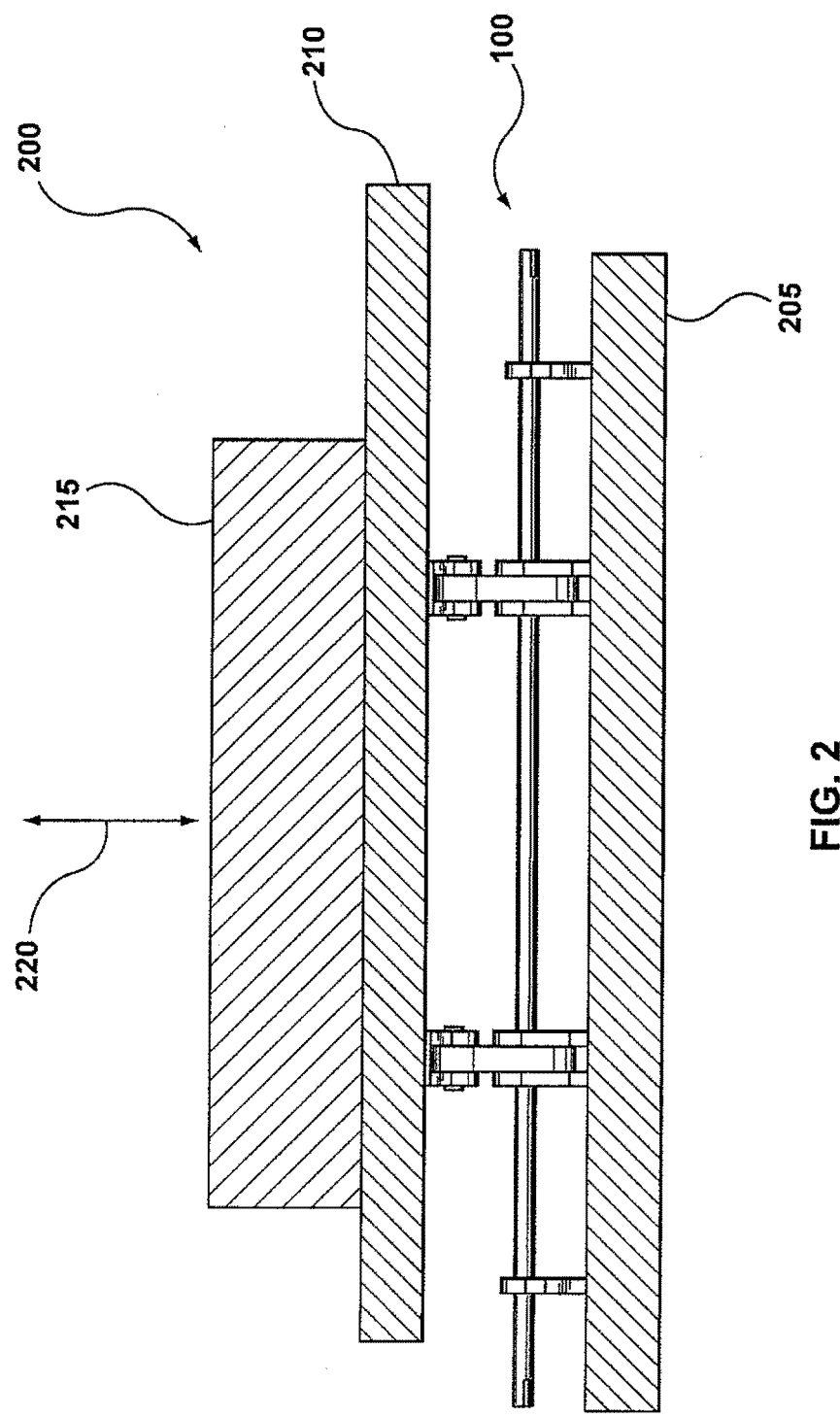

MECHANISM AND SYSTEM FOR CLAMPING

RELATED APPLICATIONS

This patent claims priority to U.S. Provisional Patent Application 61/318,729 filed Mar. 29, 2010, which is hereby incorporated by reference.

FIELD

The present document relates generally to a clamping mechanism. More particularly, the present document relates to a clamping system and mechanism for opening, closing and clamping presses for molding.

BACKGROUND

Mechanical molding presses are commonplace in the manufacturing industry. In order to lock these presses in position, it is necessary to provide a clamping system or mechanism to keep the parts of the mold in position while plastic or the like is injected under pressure. Often these clamping mechanisms are large and complex and, like many mechanical systems, may require externally applied lubricant to keep moving parts operating smoothly.

In some molding applications, additional consideration may need to be given to the loads, space constraints and clean room requirements, for example, if the molding is for medical applications or the like, where the potential for contaminant lubricant leakage is possible. In these environments, conventional hydraulic or toggle clamping mechanisms may not be appropriate. Further, electro-mechanical devices such as servo drives are generally not capable of delivering the repetitive loads and forces often required for plastic molding and typically are quite large and/or produce significant amounts of heat during operation.

SUMMARY

Thus, there is a need for a clamping apparatus that is simple, and a clamping system with efficient means to open, close and mechanically clamp a molding press. There is a further need for a clamping mechanism and system to be used in a clean-room environment, for injection and compression molding, where it would be advantageous if the clamping system and mechanism used a minimal amount or no external lubrication.

In one aspect, there is provided a clamping mechanism including: a drive; a shaft connected to the drive; an eccentric hub that is driven to rotate by the shaft; a fixed support structure that supports the eccentric hub such that the eccentric hub can rotate; and a moving support structure that is connected to the eccentric hub such that the moving support structure is driven substantially linearly based on rotational motion of the eccentric hub and serves to clamp an object between the moving support structure and a fixed structure adjacent to the moving support structure. This clamping mechanism is intended to be simple and operates with little or no external lubricants.

In a further aspect, a clamping mechanism is provided wherein the eccentric hub may be driven by a shaft through an angle of less than approximately 180 degrees. The eccentric hub of the clamping mechanism may be driven by the shaft by a drive key connecting the shaft to the eccentric hub.

In another aspect, a moving support structure of the clamping mechanism may support a first portion of a mold and the fixed structure adjacent the moving support structure may be a second portion of the mold. In one case, the clamping mechanism may further include a load cell provided to the eccentric hub to monitor the pressure applied.

In a further aspect, there is provided a clamping system including: a single drive; a shaft connected to the drive; a plurality of clamping mechanisms, each clamping mechanism comprising: an eccentric hub that is driven to rotate by the shaft; a fixed support structure that supports the eccentric hub such that the eccentric hub can rotate; a moving structure that is connected to the eccentric hub such that the moving support structure is driven substantially linearly based on rotational motion of the eccentric hub wherein the plurality of clamping mechanisms support a platen and the plurality of clamping mechanisms serve to clamp an object between the platen and a fixed structure adjacent to the platen when the eccentric hub is created.

In another aspect, a clamping system is provided wherein the eccentric hub of the clamping mechanism may be driven by the shaft through an angle of less than approximately 180 degrees. The clamping system may further have an eccentric hub of a clamping mechanism driven by a shaft by a drive key connecting the shaft to the eccentric hub.

In another aspect, a clamping system may further include a moving support structure that may support a first portion of a mold and a fixed structure adjacent to the moving support structure that may be a second portion of the mold. The clamping system may further include a load cell provided to the eccentric hub to monitor the pressure applied.

Other aspects and features will become apparent to those ordinarily skilled in the art upon review of the following description of specific embodiments in conjunction with the accompanying figures.

BRIEF DESCRIPTION OF FIGURES

Embodiments will now be described, by way of example only, with reference to the attached figures, wherein:

FIG. 2 illustrates the clamping system in use with a molding press;

DETAILED DESCRIPTION

Figure 1:
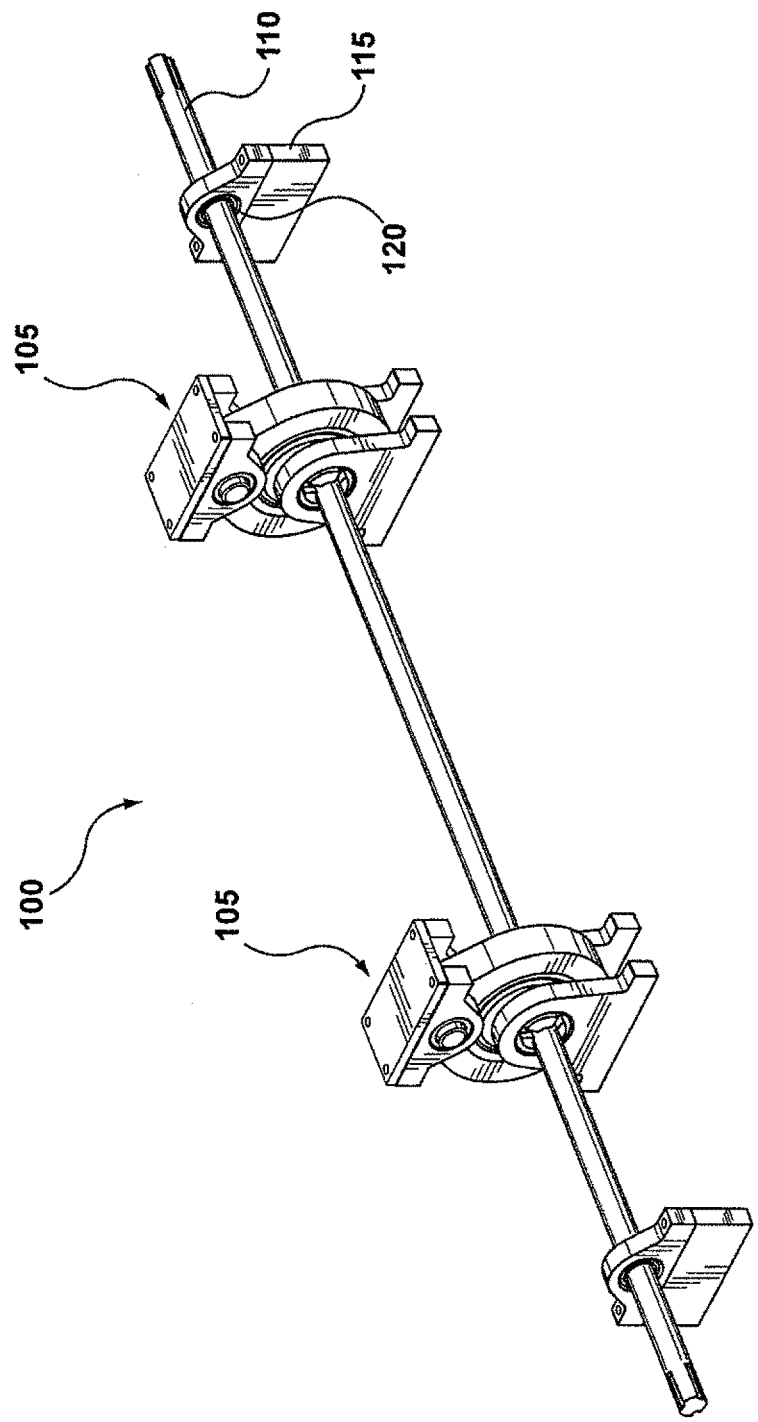
FIG. 1 illustrates a clamping system with two clamping mechanisms according to one embodiment.

FIG. 1 shows a clamping system 100 according to an embodiment herein. The clamping system 100 includes at least one clamping mechanism 105 (two are illustrated), a drive shaft 110 interacting with the clamping mechanism 105 to drive the clamping mechanism 105 and a drive (not shown) for driving the drive shaft 110. In a case where the drive shaft 110 may extend over some distance, the drive shaft 110 may be supported by a spacer 115 and spacer bearing 120.

FIG. 2 shows the use of the clamping system 100 with an injection molding press 200. The clamping system 100 is provided between a fixed platen 205 and a moving platen 210. A lower mold portion 215 is mounted on the moving platen 210. The clamping system 100 can be operated to move the moving platen 210 and lower mold portion 215 up and down in relation to an adjacent upper mold portion (not shown) as shown by arrow 220 in FIG. 2 and clamp the lower mold portion 215 in place against the upper mold portion.

Figure 3B:
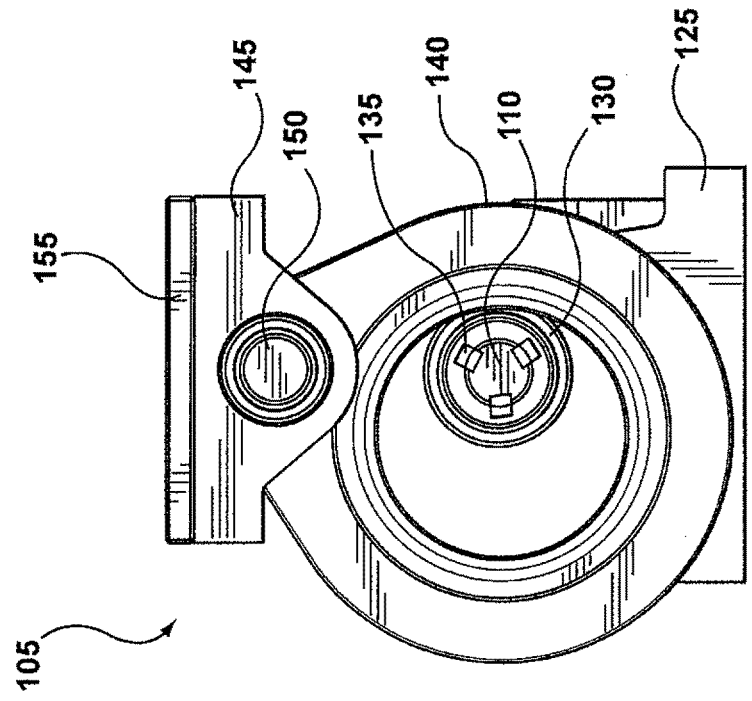
FIG. 3B illustrates the clamping mechanism in an unlocked/unclamped position.
Figure 3A:
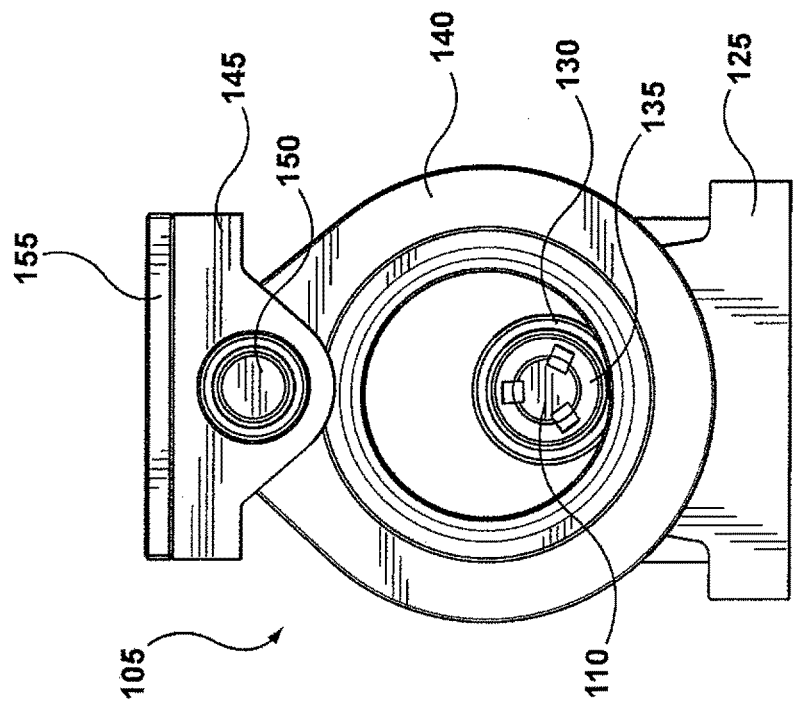
FIG. 3A illustrates a clamping mechanism is a locked/clamped position.

FIGS. 3A and 3B illustrate the clamping mechanism 105 in clamped and unclamped positions, respectively. The clamping mechanism 105 includes a fixed pillow block 125 to mount the clamping mechanism on the fixed platen 205. The fixed pillow block 125 supports the drive shaft 110 via a shaft bearing 130. The drive shaft 110 is keyed to a drive key 135 that supports and drives an eccentric hub 140. The drive key 135 may be a precision spline between the eccentric hub 140 and shaft 110, which allows for a direct drive. The eccentric hub 140 is attached to a moving pillow block 145 via a pillow bearing 150 such that the moving pillow block 145 can rotate relative to the eccentric hub 140. The moving pillow block 145 can then be attached to the moving platen 210. In some embodiments, a load cell 155 may be provided between the moving pillow block 145 and the moving platen 210. The eccentric hub 140 is configured such that a rotation of the eccentric hub 140 causes substantially linear movement of the moving pillow block 145 in a vertical direction.

Although the present embodiment illustrates vertical movement, it will be understood that there may also be situations involving non-vertical movement in which a similar mechanism may be utilized. Further, other clamping mechanisms that include an eccentric hub that is driven to rotate by a shaft and including a moving support structure such that the moving support structure is driven substantially linearly based on rotational motion of the eccentric hub may be possible. The present disclosure describes a sample embodiment that may be preferred due to its simplicity.

In operation, the clamping mechanism 105 is initially in a lowered position as shown in FIG. 3B. In this lowered position, the eccentric hub 140 is positioned such that the moving pillow block 145 is lowered. The drive shaft 110 then rotates and causes the drive key 135 to drive the eccentric hub 140 to rotate such that the moving pillow block 145 is moved linearly upward by the pillow bearing 150. The drive shaft 110 continues driving until the moving pillow block 145 and the related lower mold portion 215 is placed with sufficient pressure against the upper mold portion. The drive shaft 110 then maintains the pressure on the moving pillow block 145. When the axes of the drive shaft 110, eccentric hub 140 and pillow bearing 150 are substantially aligned normal to the direction of clamp, the clamping mechanism 105 creates a mechanically locked condition, which may be effectively as strong as the compressive structural capabilities of the weakest member of the clamping mechanism 105. The nature of the elements of the clamping mechanism acting in a single central vector results in a solid mechanical lock condition, which may only be released by rotating the eccentric hub 140, similar to the locked condition of a human elbow when the arm is fully extended. No other lock element should be necessary; however, the rotation of the drive shaft/eccentric hub may also be locked, if desired, to resist excessive vibration, although this generally would not occur in a rigid/solid press.

The eccentric hub 140 and other elements of the clamping mechanism 105 may be formed of steel or other appropriate material to provide sufficient structural strength.

The clamping mechanism 105 is somewhat similar to a crankshaft and connecting rod assembly (not shown); however, the eccentric movement of the clamping mechanism 105 will generally not involve a full revolution. The clamping mechanism 105, and in particular the eccentric hub 140, may only rotate back and forth about a given angle, and, in one particular case, the angle may be less than 180 degrees. In another case, the angle may be less than approximately 130 degrees.

The clamping system 100 may include a single clamping mechanism 105 or may include a plurality of clamping mechanisms 105 (two are shown in FIG. 1). The clamping mechanisms 105 are intended to be positioned normal and opposite the mold portions.

The clamping system 100 and clamping mechanism 105 may be harmonically driven and balanced by either a single drive (as indicated in FIG. 1) or a plurality of drives, although the use of a single drive can be more space efficient and may require less control equipment (not shown) in order to synchronize the clamping mechanisms 105. The drive may include hydraulic cylinders, servo-drives, or other suitable systems. It is anticipated that the clamping system 100 herein will be space efficient while still providing adequate clamping forces for loads up to or in excess of approximately fifty tons per mold, although this is only an estimate. It will be understood that the actual load constraints will generally be determined by the physical strength of the materials, load capability of the bearings and the torque required to preload the elements into a state of mechanical lock.

In the embodiments herein, the clamping mechanism 105 requires relatively few mechanical parts, and will typically require less or no external lubrication, since all elements are intended to move on sealed bearings or bushings. The clamping system 100 is also intended to be space efficient and effective for molds that are horizontally wide or situations involving a plurality of side-by-side molds mounted to a single set of platens. As shown in FIG. 1, additional shaft supports (such as the spacer 115 and spacer bearing 120) may be added throughout the mid-span to counteract any drive shaft 110 whip. The clamping mechanisms 105 are intended to experience reduced wear over time due to the use of sealed bearings and bushings, thus reducing any variance in movements due to wear. The bearing components (spacer bearings 115, shaft bearing 130, pillow bearing 150) may be standard commercially available needle roller bearings or similar and the clamping system 100 can be configured such that the bearing components are easily replaceable to reduce overall maintenance costs.

The clamping system 100 may allow for the velocity of the clamping mechanisms 105 (and related press platen and mold) to rapidly decrease from the start of cycle to full clamp, giving a quick but gentle action to the mold. Likewise on the opening stroke, the movement of the clamping system 100 may accelerate more as the stroke is increased until a full-open position is reached.

As the clamping system 100 uses an eccentric hub 140, the generated loads may typically be lighter until the angle of the connecting member approaches a few degrees off a straight line as shown in FIG. 3A. The increase in load can therefore be inversely proportional to the velocity of action described above. This feature may be advantageous for overcoming large quick-intensity internal mold loads due to sudden injection or compression of material being molded into mold cavities and help to avoid the mold faces (i.e. first and second portions of the mold) "cracking" open momentarily during injection and packing pressures. This feature is intended to reduce the flashing on molded parts that can occur when the mold portions part during injection pressure.

Figure 4:
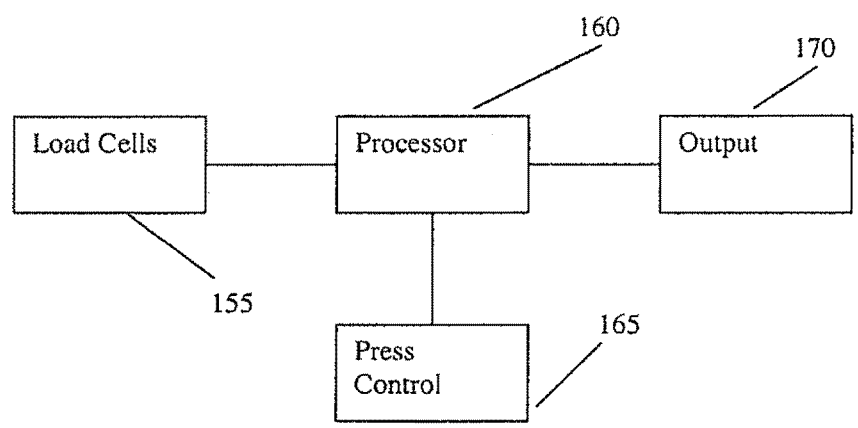
FIG. 4 illustrates a clamping system in block diagram form.

As noted above, in some embodiments, a load cell or cells 155 may be attached to each clamping mechanism 105 in order to provide feedback of real-time clamping loads per angle of the eccentric hub 140 to a processor 160, as illustrated in FIG. 4. This feedback may be used to provide mold-safety/protection in the event of a physical interference between the faces of the mold, or any other inhibitor to resistance-free closing. The mold press controls 165 may interact with the processor 160 to use the feedback from the load cell 155. The feedback may be used to prevent press and mold damage, and for real time monitoring of loads during the molding cycle and amending the output 170. For applications where more than one clamping mechanism 105 is used, for example, for wide spacing, the load cells 155 may also be used for comparative force data collection and real-time monitoring. For example, if a cavity opposite one eccentric hub or clamping mechanism was not pressurized the same as an opposing cavity opposite another clamping mechanism, this data can be reported and acted on in real time.

In the preceding description, for purposes of explanation, numerous details are set forth in order to provide a thorough understanding of the embodiments. However, it will be apparent to one skilled in the art that these specific details may not be required in order to practice the embodiments. In other instances, well-known structures may be shown in simplified or block diagram form in order not to obscure the embodiments.

The above-described embodiments are intended to be examples only. Those of skill in the art can effect alterations, modifications and variations to the particular embodiments without departing from the scope, which is defined solely by the claims appended hereto.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data; which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

What is claimed is:

1. A clamping mechanism comprising:
 a drive;
 a shaft connected to the drive;
 an eccentric hub that is driven to rotate by the shaft;
 a fixed support structure that supports the eccentric hub such that the eccentric hub can rotate; and
 a moving support structure that is connected to the eccentric hub such that the moving support structure is driven substantially linearly based on rotational motion of the eccentric hub and serves to clamp an object between the moving support structure and a fixed structure adjacent to the moving support structure.

2. The clamping mechanism of claim 1, wherein the eccentric hub is driven by a shaft through an angle of less than approximately 180 degrees.

3. The clamping mechanism of claim 2, wherein the eccentric hub of the clamping mechanism is driven by the shaft by a drive key connecting the shaft to the eccentric hub.

4. The clamping mechanism of claim 1 wherein the moving support structure of the clamping mechanism supports a first portion of a mold and the fixed structure adjacent the moving support structure is a second portion of the mold.

5. The claiming mechanism of claim 1 further comprising a load cell provide to the eccentric hub to monitor the pressure applied.

6. A clamping system comprising:
 a single drive;
 a shaft connected to the drive;
 a plurality of clamping mechanisms, each clamping mechanism comprising:
 an eccentric hub that is driven to rotate by the shaft;
 a fixed support structure that supports the eccentric hub such that the eccentric hub can rotate; and
 a moving support structure that is connected to the eccentric hub such that the moving support structure is driven substantially linearly based on rotational motion of the eccentric hub,
 wherein the plurality of clamping mechanisms support a platen and the plurality of clamping mechanisms serve to clamp an object between the platen and a fixed structure adjacent to the platen when the eccentric hub is created.

7. The clamping system of claim 6, wherein the eccentric hub of the clamping mechanism is driven by the shaft through an angle of less than approximately 180 degrees.

8. The clamping system of claim 7 further comprising the eccentric hub of the clamping mechanism driven by a shaft by a drive key connecting the shaft to the eccentric hub.

9. The clamping system of claim 6 further comprising the moving support structure that supports a first portion of a mold and the fixed structure adjacent the moving support structure is a second portion of the mold.

10. The clamping system of claim 6 further comprising a load cell provide to the eccentric hub to monitor the pressure applied.

* * * * *